(12) United States Patent
Gittleman et al.

(10) Patent No.: US 7,276,095 B2
(45) Date of Patent: Oct. 2, 2007

(54) FUEL PROCESSOR MODULE FOR HYDROGEN PRODUCTION FOR A FUEL CELL ENGINE USING PRESSURE SWING ADSORPTION

(75) Inventors: Craig S. Gittleman, Rochester, NY (US); John B. Ruhl, Rochester, NY (US); Yan Zhang, Victor, NY (US); William H. Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 431 days.

(21) Appl. No.: 10/389,375

(22) Filed: Mar. 14, 2003

(65) Prior Publication Data
US 2004/0179998 A1    Sep. 16, 2004

(51) Int. Cl.
*C10K 3/04* (2006.01)
(52) U.S. Cl. .......................... 48/128; 48/127.9; 48/75; 48/102 R; 48/94; 48/107; 48/95; 48/119; 422/190; 422/191; 422/193; 422/194; 422/209; 422/211; 422/222; 429/17; 429/19; 429/20
(58) Field of Classification Search .............. 422/190; 429/34, 17; 48/128; 95/96; 423/15
See application file for complete search history.

(56) References Cited

U.S. PATENT DOCUMENTS

| | | | |
|---|---|---|---|
| 3,430,418 A | 3/1969 | Wagner | 95/100 |
| 3,564,816 A | 2/1971 | Batta | 95/100 |
| 3,986,849 A | 10/1976 | Fuderer et al. | 95/100 |
| 4,587,114 A | 5/1986 | Hirai et al. | 423/247 |

(Continued)

FOREIGN PATENT DOCUMENTS

WO    WO 99/28013    6/1999

(Continued)

OTHER PUBLICATIONS

Olsen, John C, "Unit Process and Principles of Chemical Engineering", 1932, D. Van Norstrand Company, Inc., Chapter I, pp. 1-3.*

*Primary Examiner*—Glenn Caldarola
*Assistant Examiner*—Kaity Handal
(74) *Attorney, Agent, or Firm*—John A. Miller; Miller IP Group, PLC (57) ABSTRACT

A stand-alone fuel processor (10) for producing hydrogen from a hydrocarbon fuel for a fuel cell engine in a vehicle. The fuel processor (10) includes a primary reactor (14) that dissociates hydrogen and other by-products from the hydrocarbon fuel as a reformate gas. The reformate gas is applied to a WGS reactor (48) to convert carbon monoxide and water to hydrogen and carbon dioxide. The WGS reactor (14) may include an adsorbent for adsorbing carbon monoxide. The reformate gas from the WGS reactor (48) is then sent to a rapid-cycle PSA device (12) for adsorbing the undesirable by-products in the gas and generates a stream of pure hydrogen. A liquid water separator (70) separates water from the reformate gas before it is applied to the PSA device (12). The PSA device (12) uses a portion of the separated hydrogen as a desorbing gas to purify the adsorbent in the PSA device (12). The by-products of the reformate gas can be used as a fuel in a combustor (30) that generates heat for the primary reactor (14).

52 Claims, 3 Drawing Sheets

U.S. PATENT DOCUMENTS

| | | |
|---|---|---|
| 4,696,682 A | 9/1987 | Hirai et al. .................... 95/140 |
| 4,917,711 A | 4/1990 | Xie et al. ..................... 95/106 |
| 4,925,464 A | 5/1990 | Rabenau et al. .............. 96/124 |
| 5,112,367 A | 5/1992 | Hill ............................... 95/98 |
| 5,112,590 A * | 5/1992 | Krishnamurthy et al. 423/418.2 |
| 5,268,021 A | 12/1993 | Hill et al. ...................... 95/98 |
| 5,366,541 A | 11/1994 | Hill et al. ..................... 96/124 |
| 5,441,559 A | 8/1995 | Petit et al. .................... 96/125 |
| 5,529,763 A | 6/1996 | Peng et al. ................. 423/246 |
| 6,458,478 B1 * | 10/2002 | Wang et al. ................... 429/17 |
| 6,514,318 B2 * | 2/2003 | Keefer ........................... 95/96 |
| 6,964,692 B2 * | 11/2005 | Gittleman et al. ............ 48/128 |
| 2002/0004157 A1 | 1/2002 | Keefer et al. ................. 429/34 |
| 2002/0110504 A1 | 8/2002 | Gittleman et al. .......... 422/190 |
| 2004/0034111 A1 * | 2/2004 | Tonkovich et al. ......... 518/726 |

FOREIGN PATENT DOCUMENTS

WO      WO 00/16425      3/2000

* cited by examiner

FUEL PROCESSOR MODULE FOR HYDROGEN PRODUCTION FOR A FUEL CELL ENGINE USING PRESSURE SWING ADSORPTION

BACKGROUND OF THE INVENTION

1. Field of the Invention

This invention relates generally to a stand-alone fuel processor for a hydrogen fuel cell engine and, more particularly, to a stand-alone fuel processor for a hydrogen fuel cell engine in a vehicle that employs a rapid-cycle pressure swing adsorber device for removing carbon monoxide (CO) and other by-products from the reformate gas to produce high purity hydrogen.

2. Discussion of the Related Art

Hydrogen is a very attractive source of fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles with internal combustion engines. A hydrogen fuel cell is an electro-chemical device that includes an anode and a cathode having, an electrolyte therebetween. The anode receives a hydrogen gas and the cathode receives oxygen. The hydrogen gas is ionized in the anode to generate free hydrogen ions and electrons. The hydrogen ions pass through the electrolyte to the cathode. The hydrogen ions react with the oxygen and, the electrons in the cathode to generate water as a by-product. The electrons from the anode cannot pass through the electrolyte, and thus are directed through a load to perform work, before being sent to the cathode. The work acts to operate the vehicle. Many fuels cells are combined in a stack to generate the desired power.

Proton exchange membrane (PEM) type fuel cells are a popular fuel cell for vehicles. In a PEM fuel cell, hydrogen ($H_2$) is the anode reactant, i.e., fuel, and oxygen is the cathode reactant, i.e., oxidant. The cathode reactant can be either pure oxygen ($O_2$) or air (a mixture of $O_2$ and $N_2$). The PEM fuel cell typically includes a solid polymer electrolyte, typically made from ion exchange resins, such as perfluoronated sulfonic acid. The anode/cathode typically comprises finely divided catalytic particles, which are often supported on carbon particles and mixed with a proton conductive resin. The catalytic particles are typically precious metal particles, and thus are costly. These membrane electrode assemblies are relatively expensive to manufacturer and require certain conditions for effective operation. These conditions include proper water management and humidification, and control of catalyst fouling constituents, such as CO.

In vehicle fuel cell applications, it is desirable to use a liquid fuel, such as alcohols (methanol or ethanol), hydrocarbons (gasoline), and/or mixtures thereof, such as blends of ethanol/methanol and gasoline, as a source of hydrogen for the fuel cell. Such liquid fuels for the vehicle are easy to store on the vehicle. Further, there is a nationwide infrastructure for supplying liquid fuels. Gaseous hydrocarbons, such as methane, propane, natural gas, LPG, etc., are also suitable fuels for both vehicle and non-vehicle fuel cell applications.

Hydrocarbon-based fuels must be disassociated to release the hydrogen therefrom for fueling the cell. The disassociation reaction is accomplished within a chemical fuel processor or reformer. The fuel processor contains one or more reactors where the fuel reacts with steam, and sometimes air, to generate a reformate gas comprising primarily hydrogen and carbon dioxide. For example, in a steam-methanol reformation process, methanol and water are reacted to generate hydrogen and carbon dioxide. However, carbon monoxide and water are also produced. In a gasoline reformation process, steam, air and gasoline are reacted in a fuel processor that contains two sections. One section is primarily a partial oxidation reactor (POX) and the other section is primarily a steam reformer (SR). The fuel processor produces hydrogen, carbon dioxide, carbon monoxide and water.

The known fuel processors also typically include downstream reactors, such as a water/gas shift (WGS) reactor and a preferential oxidation (PROX) reactor. The PROX reactor is used to remove carbon monoxide in the reformate gas because carbon monoxide contaminates the catalytic particles in the PEM fuel cell. The PROX reactor selectively oxidizes carbon monoxide in the presence of hydrogen to produce carbon dioxide ($CO_2$) using oxygen from air as an oxidant. However, the use of a PROX reactor in a fuel processor adversely effects processor performance. For example, control of the air feed is important to selectively oxidize CO to $CO_2$. Also, the PROX reactor is not 100% selective, and thus results in consumption of hydrogen. Thus, the hydrogen that would normally be available to provide power is consumed by the PROX reactor. Further, the heat generated from the PROX reactor is at a low temperature, resulting in excess low-grade heat. Also, typical catalysts used in a PROX reactor contain precious metals, such as platinum or iridium, which are very expensive.

The gasoline fuel processor technology to date requires large start-up durations, large mass and large volume. The start-up time for such a system is limited by the time until the combination of the WGS reactor and the PROX reactor can reduce CO to an acceptable level to supply stack grade hydrogen. The start-up duration is determined by the mass of the catalyst system used for start-up, and the energy needed to get the catalyst system up to temperature. Another limitation of the current technology is how to utilize all of the low-grade heat that the system will generate. Any excess heat loss causes a reduction in fuel processor efficiency.

The $H_2$ generated in a fuel processor using a PROX reactor for CO clean-up typically contains less than 50% $H_2$, where the balance of the hydrogen-rich reformate consists primarily of carbon dioxide, nitrogen and water. Thus, the reformate is not suitable for compression and storage because much energy would be wasted in compressing the non-$H_2$ components in the reformate gas. Also, valuable storage space would be wasted to contain the non-$H_2$ components.

Some techniques do exist in the art for generating nearly pure $H_2$ in non-automotive fuel processing systems. One technique of generating pure $H_2$ in a fuel processing system involves the use of $H_2$ permeable membranes. These membranes selectively allow the $H_2$ to pass through and prevent the other by-product constituents in the reformate gas from permeating through. Typical membranes for these applications contain palladium, which is very expensive. Also, these membranes only operate at relatively high temperatures (250-550° C.), and thus, it takes a long time after the low temperature start-up for a fuel processing system containing $H_2$ permeable membranes to be able to generate $H_2$. Additionally, these membranes operate at very high pressures (>5 bar), which leads to exorbitant compressor loads and inefficient systems.

Another technique of generating essentially pure $H_2$ from a fuel processor using a hydrocarbon fuel employs adsorption. For example, a pressure swing adsorber (PSA) could be used to generate pure hydrogen from the reformate gas of a WGS reactor. Such a process is described in commonly owned U.S. patent application Ser. No. 09/780,184, published Aug. 15, 2002 as publication No. US 2002/0110504 A1, and herein incorporated by reference. In the fuel cell system disclosed in the '184 application, the PSA is integrated with the fuel cell stack. The PSA uses the anode off-gas from the fuel cell as a purge stream within the PSA or uses the cathode off-gas from the fuel cell to combust the low-pressure exhaust gas from the PSA. Additionally, both the anode and cathode off-gas can be used. Such a system could not be used as a stand-alone $H_2$ generator, where the $H_2$ gas is stored for subsequent use in a fuel cell engine. Similar processes for $H_2$ generation for fuel cells using a PSA are described in U.S. patent application Ser. No. 09/808,175, published Jan. 10, 2002, Publication No. US 2002/0004157 A1, and International Patent application, No. WO 00/16425, published Mar. 23, 2000.

SUMMARY OF THE INVENTION

In accordance with the teachings of the present invention, a stand-alone fuel processor for producing hydrogen from a hydrocarbon fuel for a fuel cell engine is disclosed. The fuel processor includes a primary reactor that disassociates hydrogen and other by-products, such as carbon monoxide, carbon dioxide and nitrogen, from the hydrocarbon fuel as a reformate gas. The reformate gas is applied to a WGS reactor to convert carbon monoxide and water to hydrogen and carbon dioxide. The WGS reactor may include an adsorbent for adsorbing carbon monoxide at low temperatures and to desorb carbon monoxide at high temperatures. A liquid water separator can be used to remove water from the reformate gas for further processing.

The reformate gas from the WGS reactor is then sent to an adsorber device that includes an adsorbent for adsorbing the undesirable by-products in the gas, such as carbon monoxide, carbon dioxide, nitrogen, water and methane. In one embodiment, the adsorber device is a rapid-cycle pressure swing adsorber that includes either a rotating mass of adsorbent or a rotating valve. The pressure swing adsorber uses the separated hydrogen as a desorbing gas to purify the adsorbent in the adsorber. The by-products of the reformate gas can be used as fuel in a combustor that generates heat for the primary reactor. The highly rich hydrogen from the pressure swing adsorber can be sent to a storage tank so that the fuel processor operates as a stand-alone fuel processing system.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a stand-alone fuel processor for generating nearly pure hydrogen for a fuel cell engine is merely exemplary in nature, and is in no way intended to limit the invention or its application or uses.

According to the invention, a fuel processor for a fuel cell associated with a vehicle is disclosed that includes a technique to remove carbon monoxide from the hydrogen reformate gas before the hydrogen enters the fuel cell stack, thereby advantageously eliminating the need for a PROX reactor. Also, the fuel processor of the invention generates highly rich hydrogen that allows it to be a stand-alone unit where the hydrogen can be stored in tanks and the like without storing other process by-products. Furthermore, the fuel processor of the invention is able to recover 70% of the hydrogen in the reformate gas. Further, the fuel processor of the invention provides quick carbon monoxide uptake on start-up, thereby shortening the start-up duration. Additionally, the fuel processor of the invention does not require precious metals for CO clean-up, thus reducing system cost.

Figure 1:
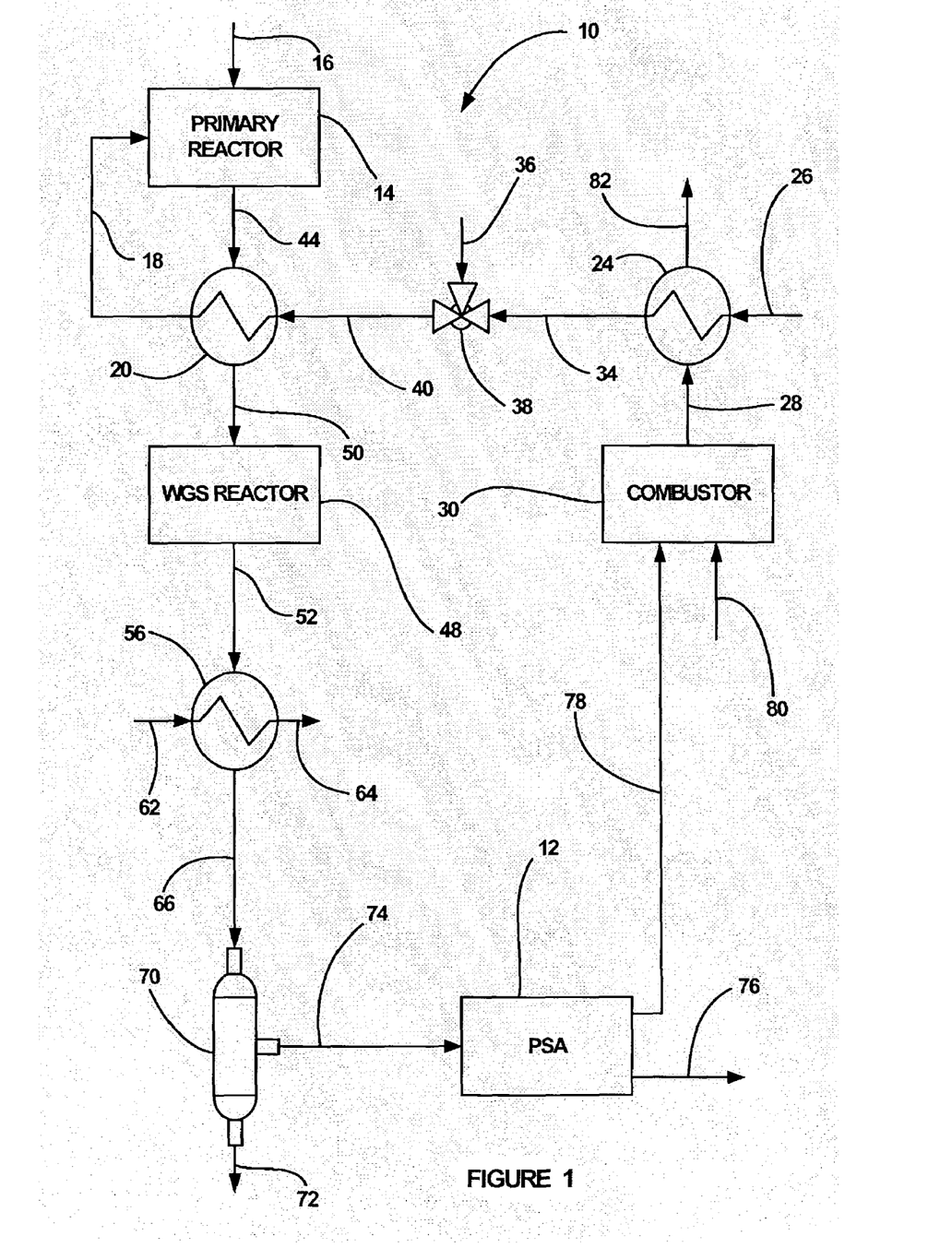
FIG. 1 is a plan view of a fuel processor system, according to an embodiment of the present invention.

FIG. 1 is a plan view of a fuel processor system 10 for generating nearly pure $H_2$ to be used in a fuel cell engine. According to the invention, the fuel processor system 10 employs a rapid-cycle pressure swing adsorber (PSA) device 12 as a primary device for removing carbon monoxide and other by-products from the reformate gas to generate pure hydrogen. As discussed above, it is necessary to remove carbon monoxide from the hydrogen gas being used in a fuel cell because carbon monoxide contaminates the catalytic particles used in the fuel cell.

A hydrocarbon fuel, such as gasoline, natural gas, methane, propane, methanol and/or mixtures thereof, is fed to a primary reactor 14, such as an autothermal reactor, from a suitable source (not shown) on a line 16. The hydrocarbon fuel reacts with a steam/air mixture received on a line 18 from a heat exchanger 20 to create hydrogen from the fuel and generate a reformate gas including hydrogen. The reactor 14 includes a steam reforming and/or partial oxidation catalyst suitable for the specific fuel being used. The temperature of the reactor 14 depends on the nature of the fuel and the relative compositions of fuel, air and water, and is typically between 300° C. and 1200° C. The fuel is converted to hydrogen in the reactor 14 either by partial oxidation, steam reforming or autothermal reforming. The reformate gas exiting the primary reactor 14 on a line 44 contains primarily hydrogen, nitrogen, carbon monoxide, carbon dioxide, water and possibly methane. The carbon monoxide concentration of the reformate gas on the line 44 is typically between about 5 mole percent and about 20 mole percent.

The steam for the steam/air mixture is generated in a heat exchanger 24, where liquid water is provided on a line 26 is heated and vaporized in the heat exchanger 24 by a hot exhaust stream on a line 28 from a combustor 30, discussed below. The steam exits the heat exchanger 24 on a line 34 and is mixed with compressed air provided on a line 36 in a mixing valve 38. The steam/air mixture exits the valve 38 on a line 40 to be sent to the heat exchanger 20 to form the hot steam/air mixture on the line 18 sent to the reactor 14. The heat required to raise the temperature of the steam on the line 40 in the heat exchanger 20 is generated by reformate gas from the reactor 14 on the line 44. Alternately, the air and water can be heated separately and mixed either within or before the primary reactor 14.

The reformate gas on the line 44 is cooled in the heat exchanger 20 to the operational temperature of a WGS reactor 48. The cooled reformate gas is then applied to the WGS reactor 48 on a line 50, where carbon monoxide and water are converted to hydrogen and carbon dioxide by a reaction process that is well understood in the art. The WGS reactor 48 is either a high temperature WGS reactor (320° C.-500° C.), a medium temperature WGS reactor (250° C.-400° C.), or a low temperature WGS reactor (150° C.-250° C.). Alternately, the reactor 48 can include a combination of high, medium and low temperature WGS reactors that employ a technique for cooling the reformate gas as it flows between the different temperature reaction zones. Generally, the temperature of the WGS reactor 48 decreases with the direction of the reformate gas flow.

According to the invention, it is possible to employ a single high temperature WGS reactor or a single medium temperature WGS reactor. These types of reactors are generally smaller than a low temperature WGS reactor or a system with one or more WGS reactors, even though the high temperature WGS reactor does not reduce the CO to very low levels because of equilibrium constraints. This is possible because of the ability of the PSA device 12 to handle relatively high CO levels that cannot be tolerated by conventional systems that use PROX reactors to convert CO to $CO_2$. Conventional catalysts, such as $Fe_3O_4/Cr_2O_3$ for high temperature shifts or $CuO/ZnO/Al_2O_3$ for low temperature shifts, may be used, as well as any other known WGS catalyst.

The WGS reactor 48 generates a reformate gas flow on a line 52 that is primarily hydrogen, nitrogen, carbon monoxide, carbon dioxide and water. The reformate gas will typically include about 0.3-3 mole percent CO depending on the exit temperature of the WGS reactor 48, the space velocity of the reformate gas in the WGS reactor 48, the steam to carbon ratio and the catalyst used.

The reformate gas on the line 52 is cooled in a heat exchanger 56 to the operating temperature of the PSA device 12 (60° C.-100° C.) by a coolant stream on a line 62 applied to the heat exchanger 56 that exits the heat exchanger on line 64. The coolant stream on the line 62 can be air that is preheated and subsequently fed into the system 10 on the line 36. The heat exchanger 56 also acts as a condenser because water in the reformate gas on the line 52 condenses as it is cooled. The cooled reformate gas leaves the heat exchanger 56 on a line 66 as a two-phase fluid consisting of a reformate gas and liquid water. The cooled reformate gas is applied to a separator 70 where the liquid water is separated from the reformate gas. The liquid water exits the separator 70 on a line 72. The water on the line 72 may then be reintroduced into the system 10 on the line 26, or any other place in the system 10 where water is used. The cooled reformate gas exits the separator 70 on a line 74, and is saturated with water vapor at a temperature between 60° C. and 100° C.

The cooled reformate gas on the line 74 is applied to the PSA device 12, where it is purified. The reformate gas on the line 74 will enter the PSA device 12 at a pressure between about 1.5 and about 7 bara. Even higher pressures, up to 15 bara, may be used if the primary reactor 14 is a steam reformer. The PSA device 12 contains an adsorbent or combination of adsorbents which adsorb all of the species in the reformate gas, except for $H_2$, as will be discussed in detail below. The $H_2$ gas exits the PSA device 12 on a line 76, and includes at least 90% $H_2$, and possibly up to 99.9% $H_2$. The CO level of the gas on the line 76 is less than about 100 ppm, and possibly less than 1 ppm. The remaining portion of the gas on the line 76 is primarily $N_2$, but may also contain up to 1% methane. If it is desired to reduce the CO concentration in the gas on the line 76 to lower levels, the gas may be fed over a methanation catalyst (not shown) where the remaining CO will react with $H_2$ to form methane.

The gas on the line 76 leaves the PSA device 12 at essentially the same pressure at which it entered, typically between 1.5 and 5 bara, allowing for a slight pressure drop of no more than 2 psi. All of the non-hydrogen gases (CO, $CO_2$, $N_2$, $H_2O$ and $CH_4$), as well as a fraction of the hydrogen, exits the PSA device 12 at about atmospheric pressure on a line 78. At least 70% of the hydrogen on the line 74 should be recovered to be sent on the line 76. It would be desirable if at least 80% of the hydrogen on the line 74 is recovered on the line 76, and most desirable 87% of the hydrogen be recovered.

The PSA device 12 is a rapid-cycle device that may include various vessels operating at different pressures. When the vessels are under pressure, the adsorbent or combination of adsorbents in the vessel will adsorb the constituents being discussed herein. When the pressure is reduced in the vessel, the adsorbed species are desorbed to be exhausted on the line 78. According to the invention, a portion of the flow of the hydrogen gas applied to the line 74 is used to flow through a depressurized vessel in the PSA device 12 to remove or desorb the unwanted by-products. Thus, some of the hydrogen does exit the PSA device 12 on the line 78.

The $H_2$ gas on the line 76 may either be fed directly into the anode side of a fuel cell stack (not shown) or stored via compression, liquefaction, in a solid form, such as hydride, or in an adsorbed state, such as on carbon nanotubes. The stored $H_2$ may then be subsequently sent to a fuel cell engine (not shown) to be used for generating electricity.

The exhaust gas on the line 78 is sent to the combustor 30, and may or may not be heated before entering the combustor 30. This exhaust gas heating could be achieved by exchanging with a temperature regulating fluid, such as air, water, glycol, or any other suitable coolant. The hydrogen and carbon monoxide in the exhaust gas on the line 78 react with oxygen in an air stream on a line 80 in the combustor 30 to form carbon dioxide and water. The air stream on the line 80 may be the exhaust gas from the cathode side of a fuel cell stack or an independent air source. If there is methane in the exhaust flow on the line 78, that may also be burned in the combustor 30. If the system 10 is integrated with a fuel cell stack, anode exhaust, which is primarily made up of hydrogen, may also be burned in the combustor 30.

Heat is generated in the combustor 30 by exothermic combustion reactions and leaves the combustor 30 as a hot combustor exhaust gas on the line 28. As discussed above, the heat is used to vaporize the water on the line 26 in the heat exchanger 24. The combustion flow on the line 28 contains primarily nitrogen, carbon dioxide and water. A cooled combustion gas stream from the heat exchanger 24 is provided on a line 82. Alternately, the combustion exhaust gas may be used to preheat the air stream on the line 36. Liquid water may be collected from the cooled stream on the line 82, and used as water to be fed into the system 10 on the line 26.

Thus, the system 10 can operate as a stand-alone system in that it does not need to be directly integrated with a fuel cell stack to provide hydrogen to the stack. The system 10 can be located at a residence, service station, or the like, where the hydrogen is stored in tanks to be transferred to tanks on the vehicle. Certain of the lines discussed above, such as the line 80, can come from the fuel cell. However, this is by way of example in that the fluid on the particular line can come from any other suitable source.

Figure 2:
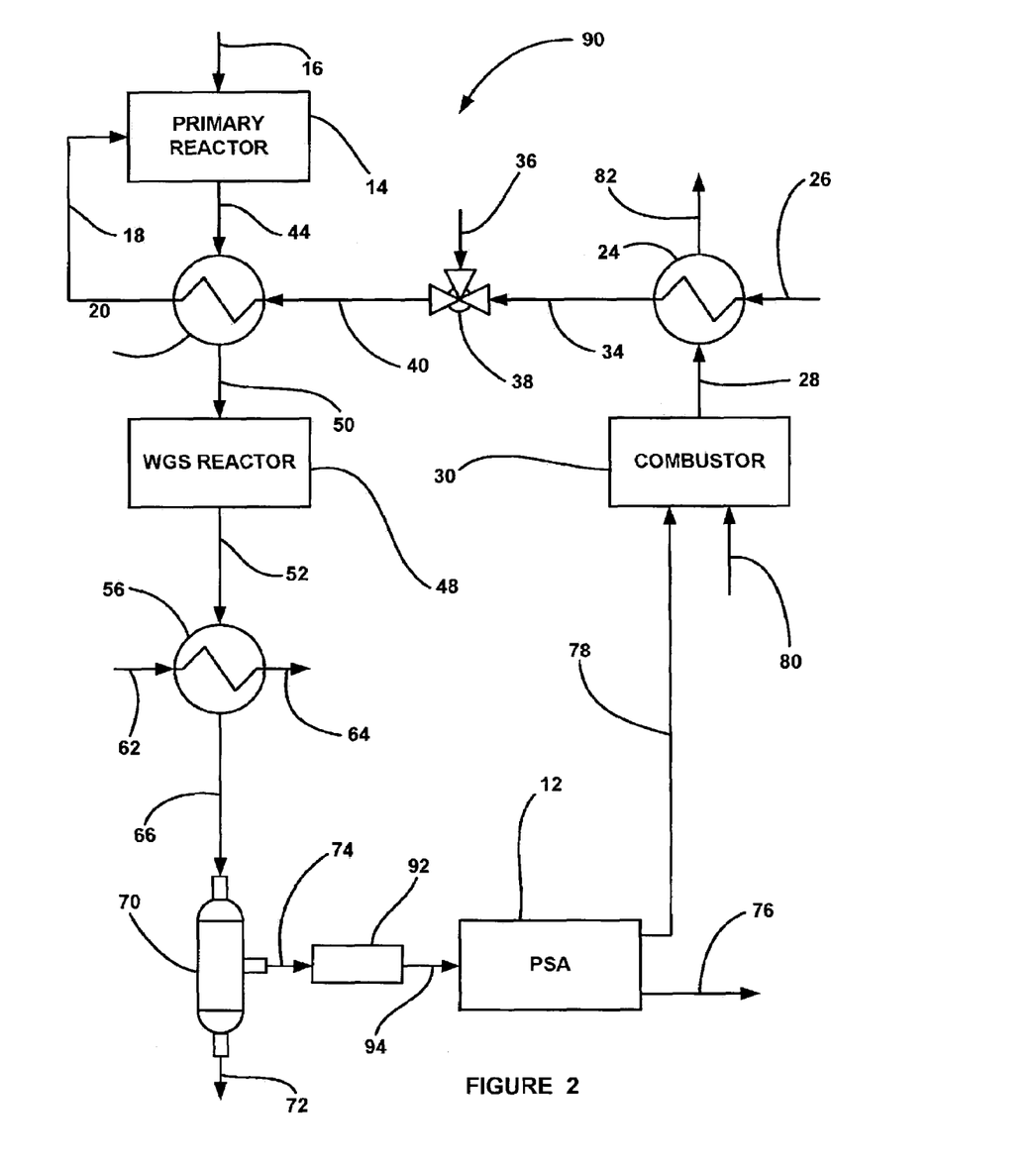
FIG. 2 is a plan view of a fuel processor system, according to another embodiment of the present invention.

FIG. 2 is a plan view of a fuel processor system 90, according to another embodiment of the present invention, that is similar to the fuel processor system 10 discussed above, where like reference numerals represent the same elements. In this embodiment, the reformate gas on the line 74 is applied to a heater 92, and the heated reformate gas from the heater 92 is then sent to the PSA device 12 on a line 94. The reformate gas is heated by the heater 92 to prevent liquid water from condensing in the PSA device 12 because condensed water could potentially damage the absorbent, electronics or valve system within the PSA device 12. In one embodiment, the heater 92 will raise the temperature of the reformate gas by about 5-10° C. The heater 92 can be an electric heater or a heat exchanger. The heat exchanger could employ a hot stream from within the fuel processor system 90 or employ a temperature regulating fluid, such as glycol, water, oil or air.

Figure 3:
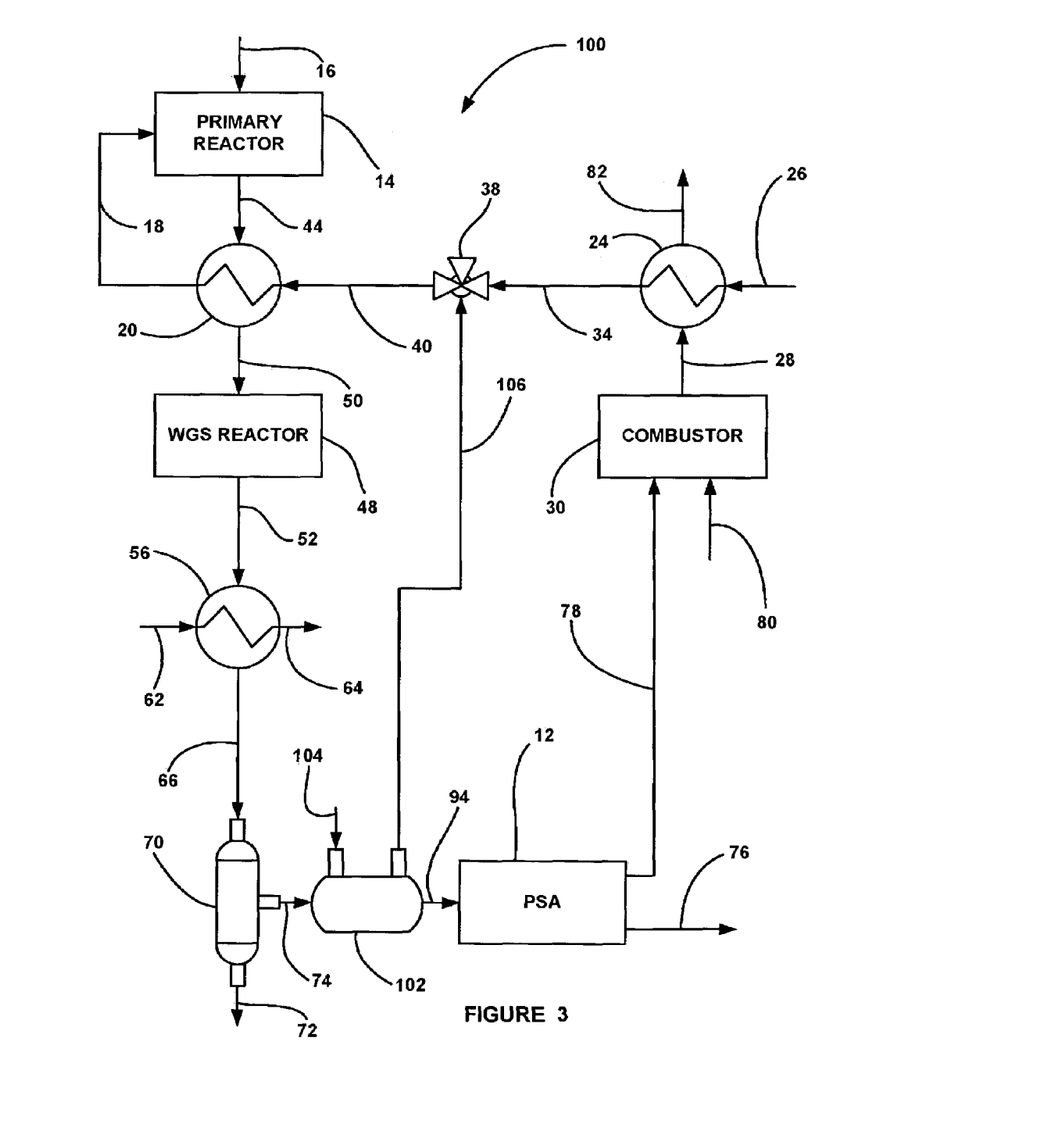
FIG. 3 is a plan view of a fuel processor system, according to another embodiment of the present invention.

FIG. 3 is a plan view of a fuel processor system 100, according to another embodiment of the present invention, that is similar to the fuel processor systems 10 and 90 discussed above, where like reference numerals represent the same elements. The system 100 includes a different technique for preventing water condensation in the PSA device 12 than using the heater 92. Particularly, water vapor is removed from the reformate gas on the line 74 by a water vapor transfer (WVT) device 102. The WVT device 102 transfers water vapor from a wet stream to a dry stream. This vapor transfer process can be accomplished by using a membrane device made of a suitable material, such as Nafion®. A membrane device containing a bundle of Nafion® tubes could be provided by Perma Pure. In this embodiment, the wet reformate gas on the line 74 passes through the device 102, and water vapor is transferred through the membrane tubes (not shown) to a dry gas flowing on the outside of the tubes. In this embodiment, the dry gas is air applied to the WTV device 102 on a line 104, and could subsequently be applied to the valve 38 on a line 106.

Alternately, the WVT device 102 can be an adsorption device, such as a heat wheel or an energy wheel, such as provided by Emprise. Such energy wheels contain a rotating drum that is made up of a desiccant, such as zeolite, silica gel or activated alumina. Water from the wet reformate on the line 74 adsorbs on the desiccant as the wet stream passes over a section of the rotating drum. The drum then rotates so that the dry stream on the line 104 flows over a second section of the drum, where it is used to desorb the adsorbed water. Thus, the water is transferred from the wet reformate gas to the dry gas stream as the drum rotates from the wet stream section and the dry stream section of the device 102.

An advantage of the systems 10, 90 and 100 described herein is the ability of the PSA device 12 to adsorb CO at start-up when the WGS reactor 48 is still below its operating temperature or water is not available for the WGS reaction. This enables stack-grade $H_2$ (<100 ppm CO) to be generated almost immediately.

At start-up, the mixing valve 38 is set so that only air, and not water, enters the primary reactor 14 along with fuel until heat has been generated in the combustor 30 to produce steam. Hydrogen and carbon monoxide are formed in the primary reactor 14 and flow into the WGS reactor 48, which is still below its operating temperature, and thus unable to shift CO and water into $CO_2$ and hydrogen. At this point, one of two things may happen, depending on the exact nature of the system. A low temperature CO adsorbent may be added into or before the WGS reactor 48 as described below. In that situation, the CO in the cold reformate gas will adsorb on the adsorbent in the WGS reactor 48.

As the WGS reactor 48 comes up to its operating temperature, the CO will desorb from the CO adsorbent, and will be shifted to $CO_2$ on the WGS catalyst. At that point, normal operation will commence. If there is no CO adsorbent either inside or before the WGS reactor 48, or there is not enough absorbent to adsorb all of the CO in the reformate gas on the line 50, then the CO will pass through the WGS reactor 48 and continue to the PSA device 12, as discussed above. The remaining CO in the gas on the line 66 will adsorb in the high-pressure section of the PSA device 12. In general, adsorbers operate more effectively at lower temperatures when adsorption capacities are higher. Therefore, the PSA device 12 will be able to adsorb CO effectively even before it reaches its final operating temperature. In both cases, normal operation will begin when the WGS reactor 48 has reached its operating temperature and enough heat has been generated in the combustor 30 to produce the steam required for normal operation of the reactors 14 and 48.

The present invention is not intended to be limited to the specifics of the system 10, 90 and 100, as many changes and variations to these embodiments can be made without departing from the spirit of the invention as discussed herein. For example, additional heating and cooling of any gas or liquid stream outside of the three heat exchangers 20, 24 and 56 may be easily accomplished. Additionally, water may be readily recovered from a variety of gas streams, such as on the lines 66, 74, 78 and 82, for reintroduction into the system 10, 90 and 100.

The adsorbent or combination of adsorbents employed in the PSA device 12 must be able to adsorb carbon monoxide, carbon dioxide, water and nitrogen. This could be accomplished using a single adsorbent material, such as zeolite. Commercial zeolite adsorbents, such as type 5A and type 13X, and mixtures thereof, are known to adsorb all of these materials. Any number of alkaline or alkaline earth cations, such as sodium, potassium, lithium or calcium, may be exchanged into these materials, either individually or in combination, using techniques that are well known in the art. Commercial activated carbon adsorbents may also be used for adsorbing $CO_2$ and light hydrocarbons, such as methane, ethane and propane, if present in trace amounts. However, the capacity of the zeolites and activated carbon adsorbents for carbon monoxide is relatively low compared to those of the other adsorbent gases. Therefore, it is sometimes desirable to add an adsorbent that has a relatively high capacity for carbon monoxide. For example, the carbon monoxide adsorbent may be a copper or silver salt impregnated or exchanged on activated carbon, alumina or zeolites, and mixtures thereof. These carbon monoxide adsorbents may selectively adsorb water instead of carbon monoxide. Therefore, a layer of desiccant (water adsorbent) may be put in the adsorber vessel upstream of the carbon monoxide adsorbent. The desiccant may be any conventional water adsorbent, such as a zeolite molecular sieve, activated alumina, silica gel or mixtures thereof.

The combining of materials can be accomplished by preparing layers of distinct particles, such as beads or extrudates, of the various adsorbents. The adsorbent materials may also be formed together into a single particle such as a bead or an extrudate, or formulated into monoliths, foams, honeycombs or the like.

Further, the WGS reactor 48 may also contain a carbon monoxide adsorbent that will adsorb carbon monoxide at temperatures below the activation temperature of the WGS catalyst. This will help to insure that carbon monoxide will not break through the reactor 48 during start-up from ambient temperatures, when the WGS catalyst is still relatively cold, until the operating temperature of the reactor 48 has been achieved. The carbon monoxide adsorbent will have a much lower capacity for carbon monoxide at the higher steady-state operating temperature of the reactor 48. A layer of the carbon monoxide adsorbent can be placed in front of the WGS catalyst, or the two materials may be combined into a single layer. The carbon monoxide adsorbent may be a copper or silver salt impregnated on activated carbon, alumina or zeolite. The carbon monoxide is regenerated from the adsorbent as the reactor 48 is heated to its operating temperature, and can then be either converted to carbon dioxide in the WGS reactor 48 or readsorbed downstream in the PSA device 12.

The PSA device 12 can be any suitable pressure swing adsorption system known in the art. Conventional pressure swing adsorption systems are typically very large and consist of a minimum of two separate adsorption vessels complete with numerous valves and manifolds. In a two-vessel system, one vessel would be in the adsorption mode and the other vessel would be in various stages of equalization, blow-down, purge and pressurization. Many commercial hydrogen PSA cycles use four vessels, with one vessel in the production stage at any given time, and the other three vessels in the various stages of equalization, blow-down, purge and pressurization. Also, some commercial hydrogen PSA cycles use twelve vessels, with four vessels in the production stage at any given time, and the other eight vessels in the various stages of equalization, blow-down, purge and pressurization. It is well known that PSA systems with more than two vessels exhibit higher hydrogen recoveries and reduced power consumption by incorporating pressure equalization steps. These multiple, staged fixed-bed PSA systems, however, contain complex valve arrangements and are non-continuous due to the cycling of these valves.

There are two types of known PSA designs that allow for continuous production in a relatively small system with minimum valving. One type uses a rotating bed of adsorbent, similar to that described above for the energy wheel, which is made more complex by the requirement to operate in a pressure swing mode. The wheel of adsorbent must be divided into discreet sections that can operate over a suitable range of pressures. The other type of PSA design allows for continuous production in a relatively small system with minimum valving employs a rotating valve to distribute the gas flows of the PSA cycle to multiple beds of adsorbent. One rotating valve can achieve the same PSA cycle that would take upwards of twenty valves in a conventional fixed-bed PSA system.

In one embodiment, the fuel processor system 10, 90 or 100 of the invention uses either a PSA device that consists of a rotating adsorbent bed or a PSA device that utilizes a rotary valve to make the fuel processor system 10, 90 or 100 small enough to fit in a vehicle or a compact hydrogen generation module. Both of these techniques allow the adsorbent mixture to cycle between fixed regions for adsorption, depressurization, purge, equalization and pressurization with cycle times much smaller than those of conventional PSA systems. The cycle time for the PSA device 12 employed in this invention should be no more than twenty seconds, and desirably should be less than one second.

The cycle of the PSA device 12 can be characterized as follows. During the production step, the reformate gas from the WGS reactor 48 is fed over the adsorbent or combination of adsorbents at the higher feed pressure. Carbon monoxide, carbon dioxide, water and nitrogen all adsorb on the adsorbent so the product gas contains primarily hydrogen. Light hydrocarbons, such as methane, ethane, ethylene, propane and propylene, heavier hydrocarbons, such as unreacted gasoline, and other trace impurities such a ammonia and hydrogen sulfide, may also be adsorbed if present in the gas flow to the PSA device 12 on the line 74. The production step is stopped before carbon monoxide breaks through the outlet of the adsorber vessel. At the end of the production step, the adsorbent is nearly saturated with adsorbed gases, and the vessel is pressurized with hydrogen, carbon monoxide, carbon dioxide, water and nitrogen.

After the production step, the pressurized vessel is placed in direct contact with a second vessel that is at lower pressure. The gas from the high-pressure vessel flows into the low-pressure vessel until the pressures in both vessels are the same or have equalized. This step is called down equalization. The two vessels can be connected either from the product ends of the vessels, the feed ends of the vessels, or from both the product and feed ends simultaneously. Any number of down equalization steps can proceed in series to further reduce the pressure from the high-pressure vessel. Desirably, the cycle will include no more than three down equalization steps.

After the down equalization step or series of down equalization steps, the adsorber vessel is depressurized from the equalization pressure to the purge pressure by exhausting the gas in the direction counter-current to the production direction. During depressurization, the product end of the adsorber vessel is sealed. Alternately, the vessel can be depressurized concurrently, and the feed end of the vessel is sealed. The depressurization exhaust gas contains hydrogen, carbon monoxide, carbon dioxide, water and nitrogen. The exhaust gas exits the adsorber vessel at essentially atmospheric pressure and is sent to the combustor 30, as described above.

After depressurization, the adsorber vessel is purged with a fraction of the $H_2$ product generated during the production step. The pressure of the fraction of the $H_2$ product to be used as purge gas is reduced to close to ambient pressure by flowing through an orifice. The purged stream-flow is at essentially ambient pressure, desirably in a direction counter-current to the production direction. The adsorber vessel may also be purged by pulling a vacuum from the direction counter-current to the production direction using a vacuum pump. The exhausted purged gas will contain most of the adsorbed carbon monoxide, carbon dioxide, water and nitrogen. The purged exhaust gas exits the adsorber vessel at essentially atmospheric pressure and is sent to the combustor 30. The purge step is terminated when essentially all of the carbon monoxide and other adsorbed gases have been desorbed from the adsorbent.

After the purge step, the vessel is placed in direct contact with a second vessel that is at higher pressure, typically following the production step described above. The low-pressure vessel is undergoing up equalization while the high-pressure vessel is undergoing down equalization. The gas from the high-pressure vessel flows into the low-pressure vessel until the pressures in both vessels are the same or equalized. The two vessels can be connected either from the product ends of the vessels, the feed ends of the vessels or from both the product and feed ends simultaneously. Any number of up equalization steps can proceed in series to further increase the pressure of the low-pressure vessel. Ideally, not more than three up equalization steps are required.

After the up equalization step, the adsorber vessel is pressurized back up to the production pressure in the same direction as the production step using the cooled hydrogen-rich reformate gas from the WGS reactor 48. During pressurization, the product end of the vessel is sealed. Alternately, the vessel may be pressurized using a fraction of the hydrogen-rich product from the adsorber on the line 76 in a direction counter-current to the production direction, and the feed end of the vessel is sealed. After pressurization, the adsorber returns to the production step and the cycle continues indefinitely.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel processing system for producing hydrogen, said system comprising:
   a primary reactor, said primary reactor generating hydrogen from a hydrocarbon fuel to generate a reformate gas including hydrogen and other by-products;
   an adsorber device, said adsorber device receiving the reformate gas from the primary reactor and adsorbing the other by-products in the reformate gas to generate a nearly pure stream of hydrogen gas;
   a combustor, said combustor generating heat for the primary reactor, wherein a line couples the adsorber device directly to the combustor and a portion of the pure hydrogen gas stream is used to desorb by-products in the adsorber device where the desorbed by-products are sent to the combustor on the line to be used as fuel;
   a separator receiving the reformate gas from the primary reactor prior to the reformate gas being applied to the adsorber device, said separator separating liquid water from the reformate gas to generate a reformate gas including primarily hydrogen, nitrogen, water vapor, carbon monoxide and carbon dioxide; and
   a water vapor transfer device receiving the reformate gas from the separator, said water vapor transfer device removing water vapor from the reformate gas.

2. The system according to claim 1 wherein the adsorber device adsorbs carbon monoxide, carbon dioxide, nitrogen, and water.

3. The system according to claim 2 wherein the adsorber device also adsorbs light hydrocarbons, methane, ethane, ethylene, propane and propylene, heavier hydrocarbons, unreacted gasoline, and other trace impurities, such as ammonia and hydrogen sulfide.

4. The system according to claim 1 wherein the adsorber device generates a stream of hydrogen gas that includes at least 70% of the hydrogen available in the reformate gas.

5. The system according to claim 1 wherein the adsorber device generates a stream of hydrogen gas that includes at least 87% of the hydrogen available in the reformate gas.

6. The system according to claim 1 wherein the reformate gas enters the adsorber device at a pressure between 1.5 and 7 bara.

7. The system according to claim 1 wherein the adsorber device includes a plurality of vessels, wherein each vessel operates in one of adsorption, equalization, blow-down, purge or pressurization.

8. The system according to claim 1 wherein the adsorber device includes a first adsorbent selected from the group consisting of activated carbon, alumina, and zeolites, such as type 5A and type 13X, and mixtures thereof, wherein the zeolites contain alkaline or alkaline earth cations, such as sodium, potassium, lithium or calcium, and mixtures thereof.

9. The system according to claim 8 wherein the adsorber device includes a second adsorbent selected from the group consisting zeolites, such as type A, X, Y, or mordenite, alumina and activated carbon and combinations thereof, wherein the second adsorbent is impregnated with a copper or silver salt, and mixtures and combinations thereof.

10. The system according to claim 1 where the adsorber device is a rapid-cycle pressure swing adsorber (PSA) device.

11. The system according to claim 10 wherein the PSA device includes a rotating adsorbent bed or a rotary valve.

12. The system according to claim 1 further comprising a water/gas shift (WGS) reactor, said WGS reactor receiving the reformate gas from the primary reactor prior to the reformate gas being applied to the adsorber device, said WGS reactor converting carbon monoxide and water in the reformate gas to hydrogen and carbon dioxide, and generating a reformate gas that is primarily hydrogen, nitrogen, carbon monoxide, carbon dioxide and water.

13. The system according to claim 12 wherein the WGS reactor includes an adsorbent for adsorbing carbon monoxide.

14. The system according to claim 12 wherein the WGS reactor includes a combination of one or more of a high temperature WGS reactor, a medium temperature WGS reactor and a low temperature WGS reactor.

15. The system according to claim 1 further comprising a heat exchanger, said heat exchanger cooling the reformate gas from the primary reactor prior to the reformate gas being applied to the separator.

16. The system according to claim 1 further comprising a first heat exchanger and a mixing valve for generating a steam/air mixture to be sent to the primary reactor, wherein liquid water is heated and vaporized in the heat exchanger, and steam exiting the first heat exchanger is mixed with compressed air in the mixing valve.

17. The system according to claim 16 further comprising a second heat exchanger, said second heat exchanger receiving the steam/air mixture from the mixing valve prior to the steam/air mixture being sent to the primary reactor and receiving the reformate gas from the primary reactor, said second heat exchanger heating the steam/air mixture prior to the steam/air mixture being sent to the primary reactor and cooling the reformate gas.

18. The system according to claim 1 further comprising a heater receiving the reformate gas prior to the reformate gas being sent to the adsorber device, said heater heating the reformate gas to prevent liquid water from condensing in the adsorber device.

19. The system according to claim 18 wherein the heater heats the reformate gas by about 5-10° C.

20. The system according to claim 1 wherein the water vapor transfer device employs a device selected from the group consisting of a membrane device and an adsorption device.

21. The system according to claim 1 wherein the system is a stand-alone unit.

22. The system according to claim 1 wherein the system is coupled to a fuel cell for generating electricity.

23. The system according to claim 22 wherein the fuel cell is in a vehicle.

24. A fuel processing system for producing hydrogen, said system comprising:

a primary reactor, said primary reactor receiving a steam/ air mixture and a hydrocarbon fuel, said primary reactor generating hydrogen from the hydrocarbon fuel to generate a reformate gas including hydrogen and other by-products;

a water/gas shift (WGS) reactor, said WGS reactor receiving the reformate gas from the primary reactor and converting carbon monoxide and water in the reformate gas to hydrogen and carbon dioxide, said WGS reactor generating a reformate gas that is primarily hydrogen, nitrogen, carbon monoxide, carbon dioxide and water;

a heat exchanger, said heat exchanger receiving the reformate gas from the WGS reactor and cooling the reformate gas to a predetermined operating temperature, said heat exchanger condensing a fraction of the water in the reformate gas from the WGS reactor;

a liquid water separator, said liquid water separator receiving the reformate gas from the heat exchanger and separating the liquid water from the reformate gas to generate a reformate gas including primarily hydrogen, nitrogen, carbon monoxide, carbon dioxide and water vapor;

a water vapor transfer device receiving the reformate gas from the separator, said water vapor transfer device removing water vapor from the reformate gas;

a rapid-cycle pressure swing adsorber (PSA) device, said PSA device receiving the reformate gas from the liquid water separator and adsorbing the other by-products in the reformate gas to generate a nearly pure stream of hydrogen gas, wherein a portion of the stream of hydrogen gas is used to desorb the by-products in the PSA device, and wherein the desorbed by-products are emitted from the PSA device on a separate line than the stream of hydrogen gas, and wherein the predetermined temperature is the operating temperature of the PSA device; and a combustor, said combustor receiving the desorbed by-products on the separate line from the PSA device and generating heat that is applied to the primary reactor to generate the hydrogen from the hydrocarbon fuel.

25. The system according to claim 24 wherein the PSA device adsorbs carbon monoxide, carbon dioxide, nitrogen and water.

26. The system according to claim 25 wherein the adsorber device also adsorbs light hydrocarbons, such as methane, ethane, ethylene, propane and propylene, heavier hydrocarbons, such as unreacted gasoline, and other trace impurities, such a ammonia and hydrogen sulfide.

27. The system according to claim 24 wherein the PSA device generates a stream of hydrogen gas that includes at least 70% of the hydrogen available in the reformate gas.

28. The system according to claim 24 wherein the PSA device generates a stream of hydrogen gas that includes at least 87% of the hydrogen available in the reformate gas.

29. The system according to claim 24 wherein the reformate gas enters the PSA device at a pressure between 1.5 and 7 bara.

30. The system according to claim 24 wherein the PSA device includes a plurality of vessels, wherein each vessel operates in one of adsorption, equalization, blow-down, purge or pressurization.

31. The system according to claim 24 wherein the adsorber device includes a first adsorbent selected from the group consisting of activated carbon, alumina, and zeolites, such as type 5A and type 13X, and mixtures thereof, wherein the zeolites contain alkaline or alkaline earth cations, such as sodium, potassium, lithium or calcium, and mixtures thereof.

32. The system according to claim 31 wherein the adsorber device includes a second adsorbent selected from the group consisting zeolites, such as type A, X, Y, or mordenite, alumina and activated carbon and combinations thereof, wherein the second adsorbent is impregnated with a copper or silver salt, and mixtures and combinations thereof.

33. The system according to claim 24 wherein the PSA device includes a rotating adsorbent bed or a rotary valve.

34. The system according to claim 24 wherein the WGS reactor includes an adsorbent for adsorbing carbon monoxide.

35. The system according to claim 34 wherein the adsorbent in the WGS reactor is selected from the group consisting zeolites, such as type A, X, Y, or mordenite, alumina and activated carbon and combinations thereof, wherein the adsorbent is impregnated with a copper or silver salt, and mixtures and combinations thereof.

36. The system according to claim 24 wherein the WGS reactor includes a combination of one or more of a high temperature WOS reactor, a medium temperature WGS reactor and a low temperature WGS reactor.

37. The system according to claim 24 further comprising a first heat exchanger and a mixing valve for generating a steam/air mixture to be sent to the primary reactor, wherein liquid water is heated and vaporized in the heat exchanger, and steam exiting the heat exchanger is mixed with compressed air in the mixing valve.

38. The system according to claim 37 further comprising a second heat exchanger, said second heat exchanger receiving the steam/air mixture from the mixing valve prior to the steam/air mixture being sent to the primary reactor and receiving the reformate gas from the primary reactor, said second heat exchanger heating the steam/air mixture prior to the steam/air mixture being sent to the primary reactor and cooling the reformate gas.

39. The system according to claim 24 further comprising a heater receiving the reformate gas from the liquid water separator, said heater heating the reformate gas to prevent liquid water from condensing in the PSA device.

40. The system according to claim 39 wherein the heater heats the reformate gas by about 5-10° C.

41. The system according to claim 24 further comprising a water vapor transfer device, said water vapor transfer device receiving the reformate gas from the liquid water separator, said water vapor transfer device removing water vapor from the reformate gas.

42. The system according to claim 41 wherein the water vapor transfer device employs a device selected from the group consisting of a membrane device and an adsorption device.

43. The system according to claim 24 wherein the system is a stand-alone unit.

44. The system according to claim 24 wherein the system is coupled to a fuel cell for generating electricity.

45. The system according to claim 44 wherein the fuel cell is in a vehicle.

46. A fuel processing system for producing hydrogen, said system comprising:

a primary reactor, said primary reactor generating hydrogen from a hydrocarbon fuel to generate a reformate gas including hydrogen and other by-products;

a water/gas shift (WGS) reactor, said WGS reactor receiving the reformate gas from the primary reactor and converting carbon monoxide and water in the reformate gas to hydrogen and carbon dioxide, said WGS reactor generating a reformate gas including hydrogen, carbon dioxide, carbon monoxide and other by-products; and a separator receiving the reformate gas from the WGS reactor and removing liquid water from the reformate gas;

a water vapor transfer device, said water vapor transfer device receiving the reformate gas and removing water therefrom; and a rapid-cycle pressure swing adsorber (PSA) device, said PSA device receiving the reformate gas from the water vapor transfer device and adsorbing the carbon monoxide and other by-products in the reformate gas to generate a nearly pure stream of hydrogen gas.

47. The system according to claim 46 wherein a portion of the stream of hydrogen gas is used to desorb the by-products in the PSA device, wherein the desorbed by-products are emitted from the PSA device on a separate stream than the stream of hydrogen gas.

48. The system according to claim 46 wherein the PSA device generates a stream of hydrogen gas that includes at least 70% of the hydrogen available in the reformate gas.

49. The system according to claim 46 wherein the PSA device includes a plurality of vessels, wherein each vessel operates in one of adsorption, equalization, blow-down, purge or pressurization.

50. The system according to claim 46 wherein the PSA device includes a rotating adsorbent bed or a rotary valve.

51. The system according to claim 46 wherein the WGS reactor includes an adsorbent for adsorbing carbon monoxide.

52. The system according to claim 47 further comprising a combustor, said combustor receiving the desorbed by-products from the PSA device and generating heat that is applied to the primary reactor to generate the hydrogen from the hydrocarbon fuel.

* * * * *